TAPE REEL THREADING MEANS

Filed Oct. 30, 1963

INVENTORS
Eduard Schüller &
Fritz Radensleben
BY Spencer & Kaye
ATTORNEYS

United States Patent Office 3,282,521
Patented Nov. 1, 1966

3,282,521
TAPE REEL THREADING MEANS
Eduard Schüller, Wedel, Holstein, and Fritz Radensleben, Leveste, Hannover, Germany, assignors to Telefunken Patentverwertungs-G.m.b.H., Ulm (Danube), Germany
Filed Oct. 30, 1963, Ser. No. 320,128
Claims priority, application Germany, Nov. 2, 1962, T 22,952
4 Claims. (Cl. 242—55.12)

This present invention relates to tape recorders.

More particularly, the present invention relates to the automatic threading of the magnetic tape onto a reel.

Conventionally, magnetic tape recorders are used in conjunction with flanged reels onto which the tape is wound. The initial threading of the tape onto the reel is, in practice, a more or less cumbersome procedure inasmuch as, after the reel is placed onto the spindle of the tape recorder proper, the tape leader has to be passed through a slit in the flange, and the reel then has to be rotated manually, generally throughout one revolution, during which time the tape leader has to be held in place. The term "leader," as used throughout the instant specification and claims, is intended to refer to the free leading end portion of the tape to be wound onto the take-up reel; this end portion may be integral with the remainder of the tape, or it may be a separate piece which is suitably attached to the remainder of the tape.

It is true that the above drawback is eliminated in the case of so-called cartridge-type reel arrangements in which the supply and take-up reel, together with the tape, are combined into a single unit which can be placed onto and removed from the tape recorder. The drawbacks of such cartridge-type units, however, is that they are generally limited to use with but one particular type of tape recorder and are therefore not interchanegable. This means that each cartridge has to be designed specifically for a given type and model tape recorder and that, unless the tape is removed, it can not be played back on a different type and model recorder than the one for which the cartridge is designed.

It is therefore, an object of the present invention to provide an arrangement for use with tape recorders that are equipped with flanged reels, which arrangement facilitates the threading of the tape. Accordingly, the present invention resides in the provision of one or more levers each of which is pivotably mounted on the tape recorder and, under the influence of a spring force, is able to swing into an operative position in which the respective lever is located between the flanges of the reel. Each lever is so configured and arranged that a tape leader introduced between the flanges of the rotating reel is deflected tangentially toward the peripheral circumference of the central drum portion of the reel. Thanks to this arrangement, all that has to be done in order to thread the tape onto the take-up reel is to insert the tape leader loosely between the flanges of the take-up reel and to start the tape feed mechanism. The tape leader is then carried along slippingly by the reel flanges, is moved against the lever or levers, and is then guided first toward and ultimately about the central drum portion of the reel, so that the tape will first loop once around the drum portion and then, certainly by the time the second loop is formed, establish a hold on and become firmly anchored to the drum portion.

In accordance with the present invention, the central drum portion of the take-up reel is provided with an overload clutch which comprises two semi-circular segments encompassing the central drum portion and an outer ring made of elastic material and pressing the segments centrally toward the drum portion, so that there is obtained an overload clutch which is of very simple construction and which can readily be attached to the drum portion of the rell.

According to a further feature of the present invention, the end portion of the lever which, when the lever is in operative position, is located between the flanges of the take-up reel, has a curvature which is approximately the same as that of the outer circumference of the central drum portion.

The lever or levers can, in addition to serving as the means for bringing about the self-threading action, act as to provide a direct or indirect indication of the amount of tape which, at any given time, is wound about the reel.

Additional objects and advantages of the present invention will become apparent upon consideration of the following description when taken in conjunction with the accompanying drawings in which.

Figure 1:
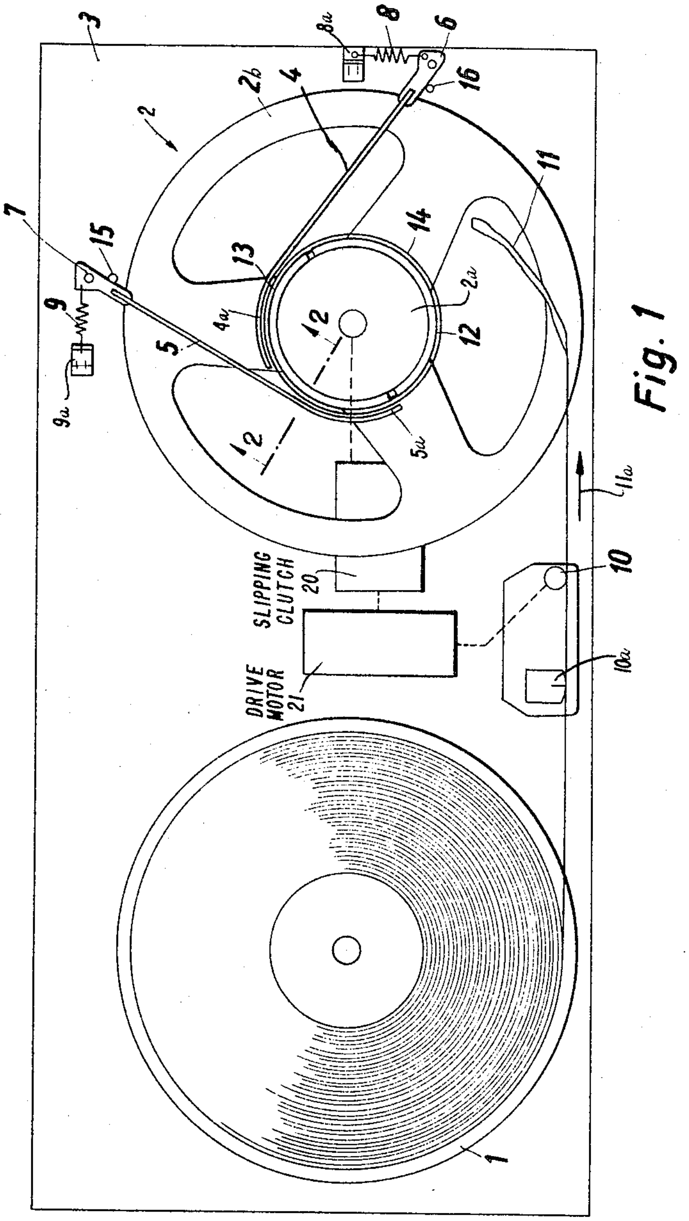
FIGURE 1 is a plan view of a tape recorder which is equipped with the self-threading arrangement according to the present invention.

Referring now to the drawings and to FIGURE 1 thereof in particular, the same shows a tape recorder 3 carrying two flanged reels 1 and 2, the former being the supply reel and the latter the take-up reel so that, during recording or play-back, the tape 11 moves in the direction of arrow 11*a* from the supply reel 1 on the left, as viewed in FIGURE 1, to the take-up reel 2 on the right. The take-up reel 2 has associated with it two levers 4 and 5 which are mounted on the deck or chassis of the tape recorder for pivotal movement about axles 6 and 7, respectively. As shown in FIGURE 1, the axles 6 and 7 are located exteriorly of the outer circumference of the reel 2. Each of the levers 4 and 5 has associated with it a spring 8, 9, one end of each spring lever connected to the respective lever and the other end anchored to a suitable stationary attachment 8*a*, 9*a*. The strength of the springs and the distance between the point at which they engage the respective levers and the axle of the respective levers are such that the springs exert a very small moment on the levers, this moment being just sufficient to cause the levers to be pivoted toward the central drum portion 2*a* of the take-up reel 2, i.e., counterclockwise as viewed in FIGURE 1. In this way, the tape is not subjected to any appreciable mechanical stress by the levers 4 and 5. The tape recorder deck or chassis also carries two abutments 15 and 16 which are positioned so as to be engaged by the levers 4 and 5, respectively. The location of the abutments determines the end position of the levers; this position is, in practice, so selected that a small distance remains between the inner surface of the curved end portion 4*a*, 5*a*, of each lever and the outer surface of the central drum portion of the reel. As illustrated in FIGURE 1, the curvature of the end portions 4*a*, 5*a*, of the levers 4, 5, is approximately the same as that of the outer circumference of the central drum portion of the reel.

Suitable means (not illustrated) may be provided for moving each of the levers between its operative and inoperative positions; the former being the position illustrated in FIGURE 1 in which the lever extends between the flanges 2*b* of the reel and the latter being a position in which the lever is completely outside of the flanges, thereby to permit removal of the reel. The means for moving the levers may, if desired, be electrical and may be operable by means of push-buttons. Alternatively, the levers may be provided with handles which facilitate the manipulation of the levers.

After the reels are placed on the deck, the tape leader is inserted between the flanges of the take-up reel, as shown in FIGURE 1. If, now, the tape feed mechanism, e.g., the capstan 10, is turned on, which turning on may be brought about by a switching action which also actuates the magnetic head **10*a* and which brings the levers 4 and 5 into their respective operative positions, the take-up reel begins to rotate at maximum speed, there being no slippage of the slipping clutch 20, which, as is conventional, power-transmittingly connects the drive motor 21 and the axle of the take-up reel. The flanges of the reel carry along the tape 11 which itself is being fed by rotation of the capstan 10. As the tape leader runs up against the lever 4, the latter deflects the tape in a direction toward the central drum portion of the reel until the tape loops about and is ultimately carried along by this drum portion, the lever 4 serving also to assist this carrying along. The second lever 5 sees to it that a loop angle of nearly 360° is reached. As soon as the tape leader has drawn itself about the central drum portion of the reel, the clutch 20 begins to slip and the magnetic tape is wound about the reel 2** with the proper tension.

In order to avoid the effects of a tension peak at the instant at which the tape becomes anchored to the take-up reel, it is desirable to provide the central drum portion of the reel itself with an overload clutch.

Figure 2:
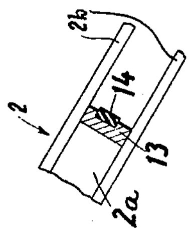
FIGURE 2 is a sectional view of the reel taken on line 2—2 of FIGURE 1.

Such an overload clutch is, in accordance with the present invention, constituted by two semi-circular segments 12 and 13 which encompass the central drum portion of the reel and are pressed against the drum portion by an outer ring 14 (FIGURE 2) made of elastic material. The ring 14 may be seated within external grooves with which the segments 12 and 13 are provided. If the ring 14 is made of a material having a high coefficient of friction, e.g., rubber, this will assist the initial entraining of the tape leader. The two segments will at first press but lightly against the drum portion of the reel. After the first turn of the tape has been looped on, the friction is increased and continues to increase with subsequent turns so that, after the initial phase, there will be no slippage between the tape and the reel.

It has been found expedient to orient the reel axes horizontally and to guide the tape in such a manner that the force of gravity will cause the tape leader, after the same has been inserted, to lie against the drum portion of the reel. But even if the reel axles are generally vertical, already a slight inclination of the reel axes will be adequate to produce this effect.

Figure 3:
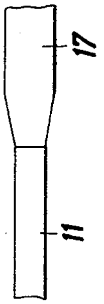
FIGURE 3 is a fragmentary view showing a suitable configuration of a tape leader for use with the present invention.

According to another feature of the present invention, the reliability of the self-threading is increased by providing the tape with a leader 17, shown in FIGURE 3, which is wider than the rest of the tape and whose width is approximately equal to the distance between the flanges of the reel. The reliability is increased even more if the leader is made of a material which is somewhat stiffer than the rest of the tape or conventional tape leaders.

It will be understood that the above description of the present invention is susceptible to various modifications, changes, and adaptations, and the same are intended to be comprehended within the meaning and range of equivalents of the appended claims.

What is claimed is:

1. In combination with a tape recorder: a take-up reel having a central drum portion and two spaced apart flanges, at least one lever pivotably mounted on the tape recorder for movement into and out of an operative position in which said lever extends between said flanges of said take-up reel, spring means coacting with said lever for biasing the same into said operative position thereof, said lever being configured to deflect tangentially toward said central drum portion of said reel a tape leader which is introduced between said flanges of the reel while the reel is rotating, the end portion of said lever which, in said operative position, is located between said flanges of said take-up reel having a curvature which is approximately the same as that of the outer circumference of said central drum portion of said take-up reel, and said central drum portion of said take-up reel being provided with an overload clutch which comprises two semi-circular segments encompassing said central drum portion and an outer ring made of elastic material and pressing said segements centrally toward said drum portion.

2. The combination defined in claim 1 wherein said ring is made of a material having a high coefficient of friction.

3. The combination defined in claim 1 wherein said segments are provided with external grooves within which said outer ring is seated.

4. In combination with a tape recorder: a take-up reel having a central drum portion and two spaced apart flanges, at least one lever pivotably mounted on the tape recorder for movement into and out of an operative position in which said lever extends between said flanges of said take-up reel, spring means coacting with said lever for biasing the same into said operative position thereof, said lever being configured to deflect tangentially toward said central drum portion of said reel a tape leader which is introduced between said flanges of the reel while the reel is rotating, and said drum portion being provided with an overload clutch which comprises two semi-circular segments encompassing said central drum portion and an outer ring made of elastic material and pressing said segments centrally toward said drum portion.

References Cited by the Examiner

UNITED STATES PATENTS

| | | | |
|---|---|---|---|
| 1,871,716 | 8/1932 | May | 242—74 |
| 2,719,013 | 9/1955 | Babcock | 242—71.8 |
| 2,891,736 | 6/1959 | Blaes | 242—55.12 |
| 2,968,449 | 1/1961 | Hajos | 242—57.1 |
| 3,181,806 | 5/1965 | Schafer | 242—74 |

FOREIGN PATENTS

| | | |
|---|---|---|
| 629,025 | 4/1936 | Germany. |

FRANK J. COHEN, *Primary Examiner.*

GEORGE F. MAUTZ, *Examiner.*